(12) United States Patent
Sotoudeh

(10) Patent No.: US 8,248,309 B2
(45) Date of Patent: Aug. 21, 2012

(54) ANTENNA ARRANGEMENT FOR HIGH SPEED DATA TRANSFER AND WIRELESS ENERGY TRANSFER

(75) Inventor: Omid Sotoudeh, Upplands Vasby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 730 days.

(21) Appl. No.: 12/371,781

(22) Filed: Feb. 16, 2009

(65) Prior Publication Data

US 2010/0207822 A1   Aug. 19, 2010

(51) Int. Cl.
*H01Q 1/24* (2006.01)
*H01Q 1/38* (2006.01)

(52) U.S. Cl. ............... 343/702; 343/700 MS; 343/906

(58) Field of Classification Search ........... 343/700 MS, 343/702, 906; 333/24 R
See application file for complete search history.

(56) References Cited

U.S. PATENT DOCUMENTS

| | | | |
|---|---|---|---|
| 5,530,637 A | 6/1996 | Fujita et al. | |
| 6,380,896 B1 * | 4/2002 | Berger et al. | 343/700 MS |
| 7,142,114 B2 * | 11/2006 | Crowley | 340/572.1 |
| 7,962,186 B2 * | 6/2011 | Cui et al. | 455/575.7 |
| 2006/0159158 A1 * | 7/2006 | Moore et al. | 375/130 |
| 2009/0111531 A1 * | 4/2009 | Cui et al. | 455/572 |

FOREIGN PATENT DOCUMENTS

| | | |
|---|---|---|
| WO | 2006/050412 | 5/2006 |
| WO | 2007/037841 | 4/2007 |

OTHER PUBLICATIONS

International Search Report for corresponding international application No. PCT/EP2009/060614 dated Nov. 10, 2009.
Written Opinion for corresponding international application No. PCT/EP2009/060614 dated Nov. 10, 2009.
Notification Concerning Informal Communications With the Applicant, date of mailing Apr. 26, 2011, corresponding to International Application No. PCT/EP2009/060614.

* cited by examiner

*Primary Examiner* — Tan Ho
(74) *Attorney, Agent, or Firm* — Renner, Otto, Boisselle & Sklar, LLP

(57) ABSTRACT

The present invention relates to an antenna arrangement, an electronic communication device and an electronic communication set. By using a parallel plate type antenna for coupling between two electronic communication devices, high speed data transfer between the electronic communication devices as well as wireless energy charging of at least one of the two electronic communication devices, can be provided.

19 Claims, 1 Drawing Sheet

ANTENNA ARRANGEMENT FOR HIGH SPEED DATA TRANSFER AND WIRELESS ENERGY TRANSFER

TECHNICAL FIELD

The present invention relates in general to an antenna arrangement, an electronic communication device, and an electronic communication set, and in more particular to an antenna arrangement, an electronic communication device and an electronic communication set for high speed data transfer and wireless energy transfer.

BACKGROUND

Portable communication devices, such as mobile phones become more and more dense. Most units and structural features, if not all, within a mobile phone are optimized in terms of space and weight in order to keep the size and weight of mobile phones down.

Wireless energy transfer is been demonstrated by for instance the applications in house-hold appliances such as tooth-brushes. Recently, Palm displayed a charging dock for charging of a mobile phone. By using magnets a mobile being positioned on the dock station is aligned in the correct position for charging.

The need to provide magnets in the dock station is a drawback. Also, the provision of magnet field responsive means in the mobile phone may take space and may not be cost-efficient.

Transfer Jet is a technology by Sony Corporation that was recently introduced for high speed data transfer up to 500 MB/s between devices within a relatively small distance, up to about 3 cm.

Since there is a strive for reducing the space required for each units, there is also a need to provide an antenna within a reduced space of a mobile phone comprising the Transfer Jet technology.

There is thus a need to provide an alternative antenna for mobile phones having pronounced space restrictions.

SUMMARY

The present invention is directed towards providing an antenna solution for electronic communication devices.

According to one aspect of the present invention, there is provided an antenna arrangement for an electronic communication device, said antenna arrangement comprising a conductive antenna sheet having a first feeding point for transceiving a radio frequency signal in the form of an electric field being polarized in at least a first dimension, the conductive antenna sheet being adapted to provide coupling in the near field region of said electric field, enabling high speed data transfer relative to the conductive antenna sheet, the conductive antenna sheet further being arranged to provide coupling of said electric field, when said conductive antenna sheet is connected to energy transfer means, enabling wireless energy transfer relative to said conductive antenna sheet.

According to another aspect of the present invention, there is provided an electronic communication device for transceiving information, wherein the electronic communication device comprises an antenna arrangement comprising a conductive antenna sheet having a first feeding point for transceiving a radio frequency signal in the form of an electric field being polarized in at least a first dimension, the conductive antenna sheet being adapted to provide coupling in the near field region of said electric field, enabling high speed data transfer relative to the conductive antenna sheet, the conductive antenna sheet further being arranged to provide coupling of said electric field, when said conductive antenna sheet is connected to energy transfer means, enabling wireless energy transfer relative to said conductive antenna sheet.

According to another aspect of the present invention, there is provided an electronic communication set, comprising a first electronic communication device for transceiving information, wherein the electronic communication device comprises a first antenna arrangement, said first antenna arrangement comprising a first conductive antenna sheet having a first feeding point for transceiving a radio frequency signal in the form of an electric field being polarized in at least a first dimension, the first conductive antenna sheet being adapted to provide coupling in the near field region of said electric field, enabling high speed data transfer relative to the first conductive antenna sheet, wherein the first conductive antenna sheet further comprises a second feeding point for transceiving the radio frequency signal in the form of an electric field being polarized in the first and a second dimension, enabling the first antenna arrangement to provide dual polarized radio frequency field coupling in the near field region of said electric field, the first electronic communication device further comprising first wireless energy transfer means connected to the first conductive antenna sheet of the first antenna arrangement, the first conductive antenna sheet further being arranged to provide coupling of said electric field, enabling wireless energy transfer within close proximity of the first conductive antenna sheet of said electric field, enabling wireless energy transfer relative to said first conductive antenna sheet, and a second electronic communication device for transceiving information, wherein the electronic communication device comprises a second antenna arrangement, said second antenna arrangement comprising a second conductive antenna sheet having a first feeding point for transceiving a radio frequency signal in the form of an electric field being polarized in at least a first dimension, the second conductive antenna sheet being adapted to provide coupling in the near field region of said electric field, enabling high speed data transfer relative to the second conductive antenna sheet, wherein the second conductive antenna sheet further comprises a second feeding point for transceiving the radio frequency signal in the form of an electric field being polarized in the first and a second dimension, enabling the second antenna arrangement to provide dual polarized radio frequency field coupling in the near field region of said electric field, the second electronic communication device further comprising second wireless energy transfer means connected to the second conductive antenna sheet of the second antenna arrangement, the second conductive antenna sheet further being arranged to provide coupling of said electric field, enabling wireless energy transfer within close proximity of the second conductive antenna sheet of said electric field, enabling wireless energy transfer relative to said second conductive antenna sheet, wherein high speed data transfer and wireless energy transfer is enabled by polarized RF coupling between the first and the second conductive antenna sheets, upon positioning said first conductive antenna sheet in close proximity of said second conductive antenna sheet.

It should be emphasized that the term "comprises/comprising" when being used in the specification is taken to specify the presence of the stated features, integers, steps or components but does not preclude the presence or addition of one or more other features, integers, steps or components or groups thereof.

BRIEF DESCRIPTION OF THE DRAWINGS

In order to explain the invention and the advantages and features thereof in more detail, embodiments will be described below, references being made to the accompanying drawings, in which.

DETAILED DESCRIPTION

With reference to the figures as presented above, a few embodiments of the present invention will now be explained.

Figure 1:
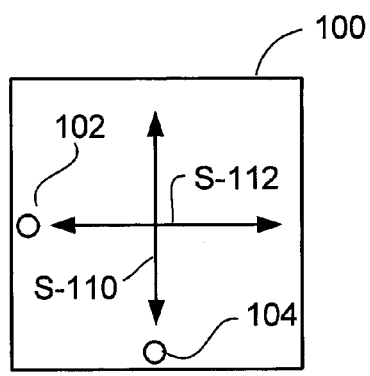
FIGS. 1 and 2 illustrate antenna arrangement shapes according to some embodiments of the present invention.

FIG. 1 presents an antenna arrangement 100 according to some embodiments of the present invention. The antenna arrangement 100 comprises a conductive antenna sheet in the form of a square. Near the periphery of the orthogonal first and second sides of the square are positioned a first 102 and a second 104 feeding point, respectively. Upon feeding the feeding point with a radio frequency signal a linearly polarized electric field S-110 can be obtained at the conductive antenna sheet 100, polarized in a direction normal to the side closest to said first feeding point. Upon feeding the feeding point 104 with a radio frequency (RF) signal a linearly polarized electric field S-110 may be obtained, as illustrated vertically in FIG. 1. Upon feeding the first and the second feeding points with a RF signal, a dual polarization can be obtained at the conductive antenna sheet 100, as indicated by the electric field vertical and horizontal polarizations S-110 and S-112, respectively.

Figure 2:
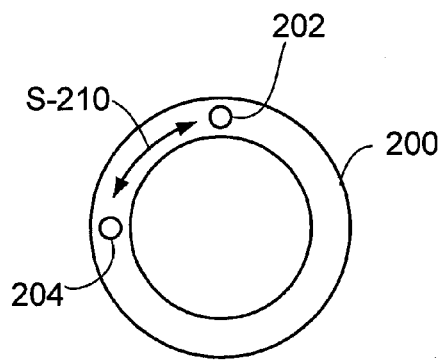

In FIG. 2 it is presented a ring-shaped circular antenna arrangement 200. Similar to the antenna as illustrated in FIG. 1, a first 202 and a second 204 radio frequency feeding point are provided on the ring-shaped antenna arrangement 200. Upon feeding the first 202 and second 204 feeding points with a first and second radio frequency signal, the second signal being 90 degrees or pi radians phase shifted in relation to the phase of the first frequency signal, a circularly polarized S-210 electric field can be obtained in the ring-shaped antenna sheet 200.

A phase shift may be provided by splitting the radio frequency signal and letting the path of the two split halves differ by a distance corresponding to a quarter of a wavelength.

A circular polarization may be obtained at antennas having a single feeding point. However, in this a case the antenna has to be designed especially to generate circular polarizations. This may be achieved by for instance using a nearly square shaped antenna, wherein the two pairs of sides in the square are not equally long, for instance when one pair being less than the resonant size and the other pair being a little longer than the resonant size, and by providing the feeding point near a corner of the square.

The feeding points can be connected to the respective conductive antenna sheet by using direct galvanic contact.

Figure 3A:
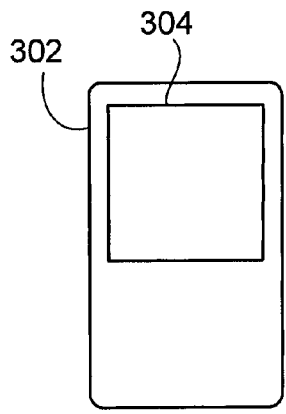
FIGS. 3A and 3B illustrate an electronic communication device presented in two in different directions according to some embodiments.
Figure 3B:
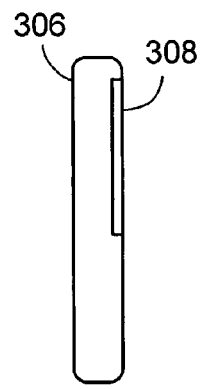

FIGS. 3A and 3B schematically illustrate an electronic communication device 302, 402 presented in two orthogonal directions. In FIG. 3A the backside of the electronic communication device 302 is presented. Depicted as 304 is an antenna arrangement 304, which in this figure is illustrated as a square.

In FIG. 3B it is presented a side-view of a electronic communication device 306. The antenna arrangement as depicted by 304 in FIG. 3A is in FIG. 3B depicted by 308, and is positioned near the periphery of the electronic communication device 306. According to some embodiments of the present invention, the antenna arrangement 308 can be positioned in the shell or the cover of the mobile phone, such that it is positioned outside the battery (not shown), which battery often is located at the rear side of the mobile phone.

Figure 4A:
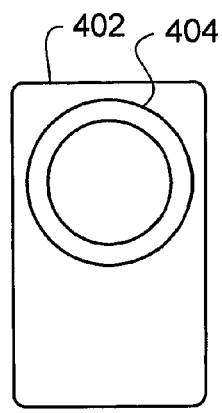
FIGS. 4A and 4B illustrate an electronic communication device presented in two in different directions according to some embodiments.
Figure 4B:
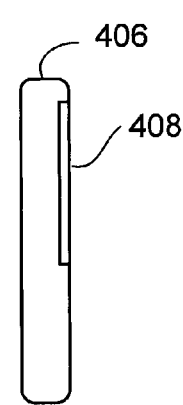

FIGS. 4A and 4B, present an electronic communication device 402 and 406, respectively. Similar to the views of FIGS. 3A and 3B, FIGS. 4A and 4B are rear and side views of the mobile phone, respectively.

In FIG. 4A the rear of an electronic communication device 402 is illustrated revealing the antenna arrangement 404 in the form of an essentially circular ring. In the side view of FIG. 4B the location of the antenna arrangement 408 is illustrated in relation to the outer dimensions of the electronic communication device 406, indicating that the antenna arrangement 408 may be positioned close to the exterior boarder of the electronic communication device 406.

Again, the antenna arrangement may be positioned in the rear shell, or at least adjacent and/or in direct contact with shell, of a mobile phone, being one example of the electronic communication device It can be mentioned that the electronic communication devices as presented in FIGS. 3A, 3B, 4A and 4B may according to at least some embodiments of the present invention be mobile phones.

Figure 5:
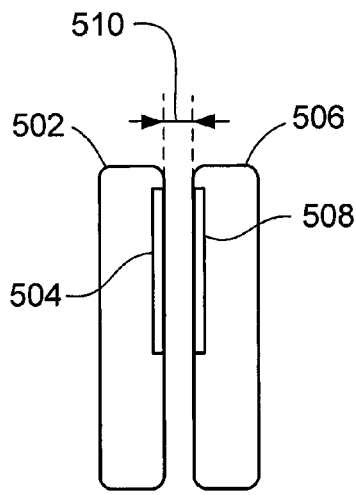
FIG. 5 illustrate two electronic communication devices positioned at a distance from each other.

In FIG. 5 there are presented a first electronic communication device 502 and a second electronic communication device 506 positioned parallel to each other at a distance 510 from each other, where a first antenna arrangement 504 is positioned opposite to the second antenna arrangement 508.

It should be mentioned that the antenna arrangement may according to some embodiment of the present invention be adapted for high speed data transfer, such as Transfer Jet.

The antenna arrangement operating for high speed data transfer such as Transfer Jet is adapted to have an outer dimension around one half of the wavelength at the operational frequency. It can be noted that general antenna theory dictates that a resonant patch antenna or microstrip antenna has an outer dimension in the order of half a wavelength of the operational frequency.

Moreover, the electronic communication devices 502, 506 may comprise energy transfer means connected to the different antenna arrangements, for providing wireless energy charging of at least one of the two electronic communication devices 502, 506, when positioning the two devices in close proximity in relation to one another.

It should be mentioned that wireless as used herein means without the prerequisite of a galvanic contact between antenna arrangements. Direct contact without galvanic contact is thus comprised by the term "wireless".

For instance a battery located in the electronic communication device 502 may be charged by a source battery located in the electronic communication device 504, or vice versa.

Figure 6:
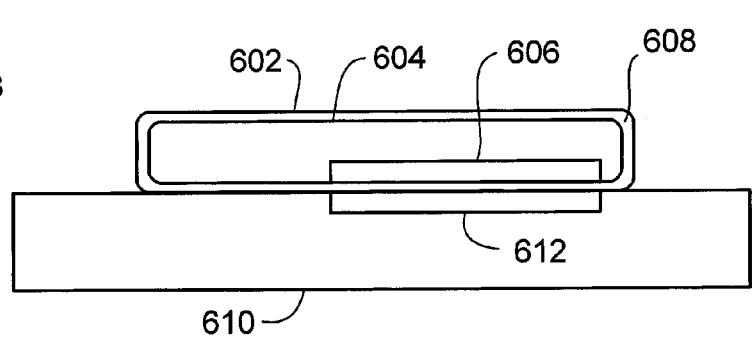
FIG. 6 illustrates an electronic communication set according to some embodiments of the present invention.

In FIG. 6 it is presented an electronic communication device 602 in close proximity to a charging station 610, being one example of an electronic communication device, adapted to charge the mobile phone 602. An efficient wireless energy charging is enabled by a strong coupling between a first 606 and second 612 antenna arrangement of the two devices.

Strong coupling may be obtained by using a small distance between the conductive antenna sheets of the respective antenna arrangements, and by using antenna sheets that have large areas.

In FIG. 6, the mobile phone 602 is presented as having a shell or a cover 608 surrounding the interior 604 of the mobile phone 602, for which reason the distance between the conductive antenna sheet 606 of the mobile phone and a conductive antenna sheet 612 of the charging station 610 approximately corresponds to the thickness of the shell or the cover 608 of the mobile phone, when positioning the mobile phone 602 on the charging station 610.

In order to provide a strong coupling between the first and second antenna sheets, for efficient charging, the distance between the two antenna arrangements shall be kept small, i.e. about 1 milli meter or at least less than one centi meter.

A considerably strong coupling can accordingly be obtained in the case the two antenna sheets are permitted to contact each other. In order to prevent wear and tear a thin cover or film may be provided on one or both antenna arrangements.

For practical reasons a cover 608 or shell may thus be used outside the antenna sheet 606, where the cover or shell is preferably made of dielectric material such a plastic material that is used for most mobile phones.

At operation at a frequency at about 700 mega Hertz to about 10 giga Hertz, the dielectric material shall preferably be chosen to provide most energy further and not absorb the electromagnetic energy, yielding low energy losses in the cover 608.

It is thus preferable a dielectric material that has a low imaginary part of the complex permittivity, wherein this part is related to dissipation or loss of energy within the chosen material.

According to some embodiments of the present invention, the antenna arrangements are adapted to provide a significant coupling between the first antenna sheet 606 and the second antenna sheet 612, at a frequency in order of about 700 mega Hertz to about 10 giga Hertz, preferably about 4.48 giga Hertz, being frequency data for high speed data transfer.

The high speed energy transfer technology discussed herein comprises Transfer Jet.

By providing the antenna arrangement in the shell or cover or at least at the rear outside the battery, i.e. on the backside of the battery, of a mobile phone, a minimum of space is used in the interior of the phone, whereby the space required by the mobile phone becomes smaller. The antenna arrangement can thus be placed in the back shell of the mobile phone. This shell may or may not be a battery lid of the mobile phone.

Since the antenna arrangements can be provided near the surface or periphery of the electronic communication device, or mobile phone, the limited range of the electric field in the near field region of the electric fields does not cause a problem of a too low a signal. Rather, as the reach is relatively short, interference between various devices from larger distances is kept to a minimum.

For the wireless energy charging a close proximity between the two conductive antenna sheets is preferable, typically less than about 1 centimeter.

According to some embodiments of the present invention, the antenna arrangement may be comprise a singular feeding point, such that upon feeding said feeding point with an RF signal a linearly polarized electric field is obtained at the antenna sheet of the antenna arrangement.

According to some embodiments of the present invention the antenna arrangement may be comprise a singular feeding point, and wherein the antenna is so designed such that upon feeding said feeding point with an RF signal a circularly polarized electric field is obtained at the antenna sheet of the antenna arrangement.

A first electronic communication device having a linearly polarized antenna may provide a near field coupling to another electronic communication device having a linearly polarized antenna. The coupling between the two antennas is in this case dependent on the relative orientation of the two antennas. A parallel or anti-parallel orientation can provide a substantial coupling, whereas an orthogonal relative orientation of the two antennas provides minimum of coupling.

Within an electronic communication set comprising a first electronic communication device having a first antenna arrangement being linearly polarized, a near field coupling may be experienced with a second electronic communication device having a second antenna arrangement having a dual polarization. In this case of interaction between the antenna having a single polarization and the antenna having the dual polarization, the coupling is more independent of the relative orientation of the first antenna arrangement and the second antenna arrangement.

In case the first and second electronic communication devices each has an antenna arrangement that is dual polarized, the relative orientation of the first and second antenna arrangements is of less importance since both antennas can receive polarizations in two different dimensions. Each polarization from one antenna arrangement can be separated into two polarization components in any two orthogonal directions of the other antenna.

According to some embodiment of the present invention the first and second antenna arrangements may be adapted to be dual polarized and in case the radio frequency signal that is fed a first feeding point has a phase shift of 90 degrees pi radians relative to the phase of the radio frequency signals to be fed to the a second feeding point. By feeding the first and second feeding points with such phase shifted signals, a circularly polarized electric field is obtained at the antenna sheet. In order to obtain such a circular polarization the antenna sheet must be adapted such that such polarization mode can be obtained. One prerequisite is the restriction of the shape of the antenna sheet, being that the antenna sheet must be circular in shape. A ring-shape with a circular outer diameter also fulfils the requirement for circular polarization at antenna arrangements.

According to an alternative, the first and second antenna arrangements may be adapted to generate a circular polarization, from conductive antenna sheets having singular antenna feeds. By provision of nearly square antenna sheets wherein two opposite sides are slightly longer than half a wavelength and the other opposite sides are slightly shorter than half a wavelength, of the operational frequency, the resulting polarization may be circular, upon feeding the radio frequency signal at a position near a corner of the near square.

Since the coupling in the near field region between the two antennas increases with an increasing area, antennas having a larger interacting area, i.e. larger conductive antennas sheets, can provide a stronger coupling. Consequently, the coupling between two circular sheets in close proximity is stronger than the coupling between two ring-shaped sheets having an outer diameter in the order of the diameter of the circular conductive sheet.

It can be clarified that whenever an electric field is mentioned herein, it is to be understood that the electromagnetic field is accompanied by a corresponding magnetic field, forming an electromagnetic field.

At least some of the embodiments come with a number of advantages of which a few are:

By using antenna arrangements according to the present invention, high speed data transfer and energy charging can be provided in electronic communication devices having a shortage of space.

By using an antenna arrangement according to the invention, the same antenna means can be used for said dual functions providing a solution to the problem how to implement said dual functions in a restricted space electronic communication device.

Although the antenna arrangements are presented above have been illustrated as planar, there is practically no planarity requirement of these antenna arrangements. Rather, these antenna arrangements may advantageously well conform to the physical structure of the electronic communication device and mobile phone. As long as a reasonably close proximity is obtained in the case for wireless energy transfer the technical effect is well maintained.

It is emphasized that the present invention can be varied in many ways, of which the embodiments as presented are just a few examples. These embodiments are hence non-limiting. The scope of the present invention is however, limited by the subsequently following claims.

The invention claimed is:

1. An antenna arrangement for an electronic communication device, said antenna arrangement comprising:
    a conductive antenna sheet having a first feeding point for transceiving a radio frequency signal in the form of an electric field being polarized in at least a first dimension, the conductive antenna sheet being adapted to provide coupling in the near field region of said electric field, enabling high speed data transfer relative to the conductive antenna sheet, the conductive antenna sheet further being arranged to provide coupling of said electric field, when said conductive antenna sheet is connected to energy transfer means, enabling wireless energy charging of a battery of the electronic communication device by energy transfer via said conductive antenna sheet.

2. The antenna arrangement according to claim 1, wherein the conductive antenna sheet further comprises a second feeding point for transceiving the radio frequency signal in the form of an electric field being polarized in the first and a second dimension, enabling the antenna arrangement to provide dual polarized radio frequency field coupling in the near field region of said electric field.

3. The antenna arrangement according to claim 2, wherein the first and second feeding points are positioned on the conducting sheet, orthogonal in relation to one another, for providing orthogonal first and second radio frequency field polarizations.

4. The antenna arrangement according to claim 2, wherein the conductive sheet essentially is circular.

5. The antenna arrangement according to claim 2, wherein the conductive sheet has a ring shape.

6. The antenna arrangement according to claim 1, wherein the conductive sheet essentially is a square.

7. The antenna arrangement according to claim 1, wherein the conductive antenna sheet is adapted for high speed data transfer in the radio frequency range of about 700 mega Hertz to 10 giga Hertz.

8. The antenna arrangement of claim 7, wherein the conductive antenna sheet is adapted for high speed data transfer at a radio frequency of about 4,48 giga Hertz.

9. An electronic communication device for transceiving information, wherein the electronic communication device comprises:
    an antenna arrangement according to claim 1.

10. The electronic communication device according to claim 9, wherein the electronic communication device comprises a mobile phone.

11. An electronic communication device for transceiving information, wherein the electronic communication device comprises:
    an antenna arrangement comprising:
        a conductive antenna sheet having a first feeding point and a second feeding point for transceiving a radio frequency signal in the form of an electric field being polarized in a first dimension and a second dimension, enabling the antenna arrangement to provide dual polarized radio frequency field coupling in the near field region of said electric field, the conductive antenna sheet being adapted to provide coupling in the near field region of said electric field, enabling high speed data transfer relative to the conductive antenna sheet, and
    wireless energy transfer means connected to the conductive antenna sheet of the antenna arrangement, enabling wireless energy transfer within close proximity of the conductive antenna sheet of said electric field, enabling wireless energy charging of a battery of the electronic communication device by a dual polarized radio frequency field received by said conductive antenna sheet.

12. The electronic communication device according to claim 11, for which the conductive sheet essentially is circular, said electronic communication device further comprising a phase shifting unit for providing a phase shift of the radio frequency signal for the second feeding point, relative to the phase of the radio frequency signal for the first feeding point, providing a circularly polarized electric field.

13. The electronic communication device according to claim 11, for which the conductive sheet has a ring shape, said electronic communication device further comprising a phase shifting unit for providing a phase shift of the radio frequency signal for the second feeding point, relative to the phase of the radio frequency signal for the first feeding point, providing a circularly polarized electric field.

14. The electronic communication device according to claim 11, wherein the electronic communication device comprises a mobile phone.

15. The electronic communication device according to claim 11, wherein the electronic communication device comprises a charging station adapted to charge a mobile phone.

16. The electronic communication device according to claim 11, wherein the wireless energy transfer means is adapted for operation at a frequency within the range of about 500 kilo Hertz to about 10 mega Hertz.

17. An electronic communication set, comprising:
    a first electronic communication device, and
    a second electronic communication device, wherein each of the respective first and second electronic communication devices is according to claim 11, wherein high speed data transfer and wireless energy transfer is enabled by polarized RF coupling between the first and the second conductive antenna sheets, upon positioning said first conductive antenna sheet in close proximity of said second conductive antenna sheet.

18. The electronic communication device according to claim 11, wherein the antenna arrangement is provided in a battery lid of the electronic communication device.

19. The electronic communication device according to claim 18, wherein the wireless energy transfer means enables wireless energy charging of the battery while no high speed data transfer is being performed relative to the conductive antenna sheet.

* * * * *

UNITED STATES PATENT AND TRADEMARK OFFICE
CERTIFICATE OF CORRECTION

| | | |
|---|---|---|
| PATENT NO. | : 8,248,309 B2 | Page 1 of 1 |
| APPLICATION NO. | : 12/371781 | |
| DATED | : August 21, 2012 | |
| INVENTOR(S) | : Omid Sotoudeh | |

It is certified that error appears in the above-identified patent and that said Letters Patent is hereby corrected as shown below:

Col. 7, lines 60-62;

Claim 8 incorrectly reads: The antenna arrangement of claim 7, wherein the conductive antenna sheet is adapted for high speed data transfer at a radio frequency of about 4,48 giga Hertz.

Claim 8 is corrected to read: The antenna arrangement of claim 7, wherein the conductive antenna sheet is adapted for high speed data transfer at a radio frequency of about 4.48 giga Hertz.

Signed and Sealed this
Twenty-third Day of October, 2012

David J. Kappos
*Director of the United States Patent and Trademark Office*